United States Patent
Denham et al.

(10) Patent No.: US 11,749,438 B2
(45) Date of Patent: Sep. 5, 2023

(54) THERMO-MECHANICAL MAGNETIC COUPLER

(71) Applicant: The Aerospace Corporation, El Segundo, CA (US)

(72) Inventors: Donald Wayne Denham, Redondo Beach, CA (US); John Patrick McHale, Whittier, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 629 days.

(21) Appl. No.: 16/011,643

(22) Filed: Jun. 19, 2018

(65) Prior Publication Data

US 2019/0385774 A1 Dec. 19, 2019

(51) Int. Cl.
*H01F 7/20* (2006.01)
*F16B 1/00* (2006.01)
*H01F 7/02* (2006.01)

(52) U.S. Cl.
CPC .................. *H01F 7/20* (2013.01); *F16B 1/00* (2013.01); *H01F 7/021* (2013.01); *F16B 2001/0035* (2013.01); *H01F 2007/208* (2013.01)

(58) Field of Classification Search
CPC ..................................................... H01F 7/0257
USPC ......................................................... 335/285
See application file for complete search history.

(56) References Cited

U.S. PATENT DOCUMENTS

| | | | | |
|---|---|---|---|---|
| 3,428,867 A | * | 2/1969 | Becker | H01F 13/003 361/148 |
| 3,544,041 A | | 12/1970 | Billerbeck | |
| 3,978,441 A | | 8/1976 | Sobottka et al. | |
| 4,264,887 A | * | 4/1981 | Barrett | H01F 7/206 335/289 |
| 4,381,092 A | | 4/1983 | Barker | |
| 4,480,014 A | * | 10/1984 | Milligan | H01H 1/023 148/430 |
| 4,523,083 A | * | 6/1985 | Hamilton | A47J 36/2461 206/818 |
| 4,700,475 A | * | 10/1987 | Jost | H01R 43/16 200/266 |
| 5,096,279 A | * | 3/1992 | Hornbeck | B81B 3/0008 348/770 |
| 5,270,678 A | | 12/1993 | Gambut et al. | |
| 5,410,924 A | * | 5/1995 | Krasnov | E21B 19/161 81/57.33 |

(Continued)

OTHER PUBLICATIONS

Debra Werner, "Aerospace Corp.'s iLab Encourages Out-of-the-Box Thinking Without Leaving Home", Space News, Mar. 7, 2018.

(Continued)

*Primary Examiner* — Alexander Talpalatski

(74) *Attorney, Agent, or Firm* — LeonardPatel PC

(57) ABSTRACT

An electromagnetic mooring system (MMS) that includes a first object and a second object, at least one of which includes an electronic coupler configured to connect the first object with the second object. The electronic coupler comprises a pair of magnets, at least one of which is an electro permanent magnet (EPM), having a flux path. When the electronic coupler is in the ON states, the flux path moves towards the first or second object transferring heat from the first or second object to the second or first object, and when the electronic coupler is in the OFF state, the flux paths moves towards the EPM.

22 Claims, 12 Drawing Sheets

(56) References Cited

U.S. PATENT DOCUMENTS

| | | | | |
|---|---|---|---|---|
| 5,904,096 | A * | 5/1999 | Fawcett | B41F 27/02 |
| | | | | 101/389.1 |
| 6,104,270 | A * | 8/2000 | Elias | B66C 1/04 |
| | | | | 335/289 |
| 6,288,623 | B1 | 9/2001 | Janzen | |
| 7,151,428 | B2 * | 12/2006 | Flood | H01F 7/20 |
| | | | | 335/285 |
| 7,453,341 | B1 | 11/2008 | Hildenbrand | |
| 8,031,038 | B2 * | 10/2011 | Kimura | B29C 45/1742 |
| | | | | 335/285 |
| 9,220,365 | B1 * | 12/2015 | Okonkwo | H01F 7/20 |
| 9,231,323 | B1 | 1/2016 | Jaeger | |
| 9,589,715 | B2 * | 3/2017 | Choi | H01F 7/0257 |
| 10,236,107 | B2 | 3/2019 | Choi | |
| 10,460,864 | B2 * | 10/2019 | Choi | H01F 7/0257 |
| 2006/0016935 | A1 | 1/2006 | Jordan | |
| 2008/0257655 | A1 | 10/2008 | Ito et al. | |
| 2010/0112194 | A1 * | 5/2010 | Inoue | C23C 14/042 |
| | | | | 427/66 |
| 2014/0227023 | A1 | 8/2014 | Sone | |
| 2016/0284497 | A1 * | 9/2016 | Stryker | H03K 17/96 |

OTHER PUBLICATIONS

Alexander Talpalatski, "Non-Final Office Action", dated Nov. 26, 2021, U.S. Appl. No. 16/533,651.

Alexander Talpalatski, "Notice of Allowance", dated Mar. 7, 2022, U.S. Appl. No. 16/533,651.

* cited by examiner

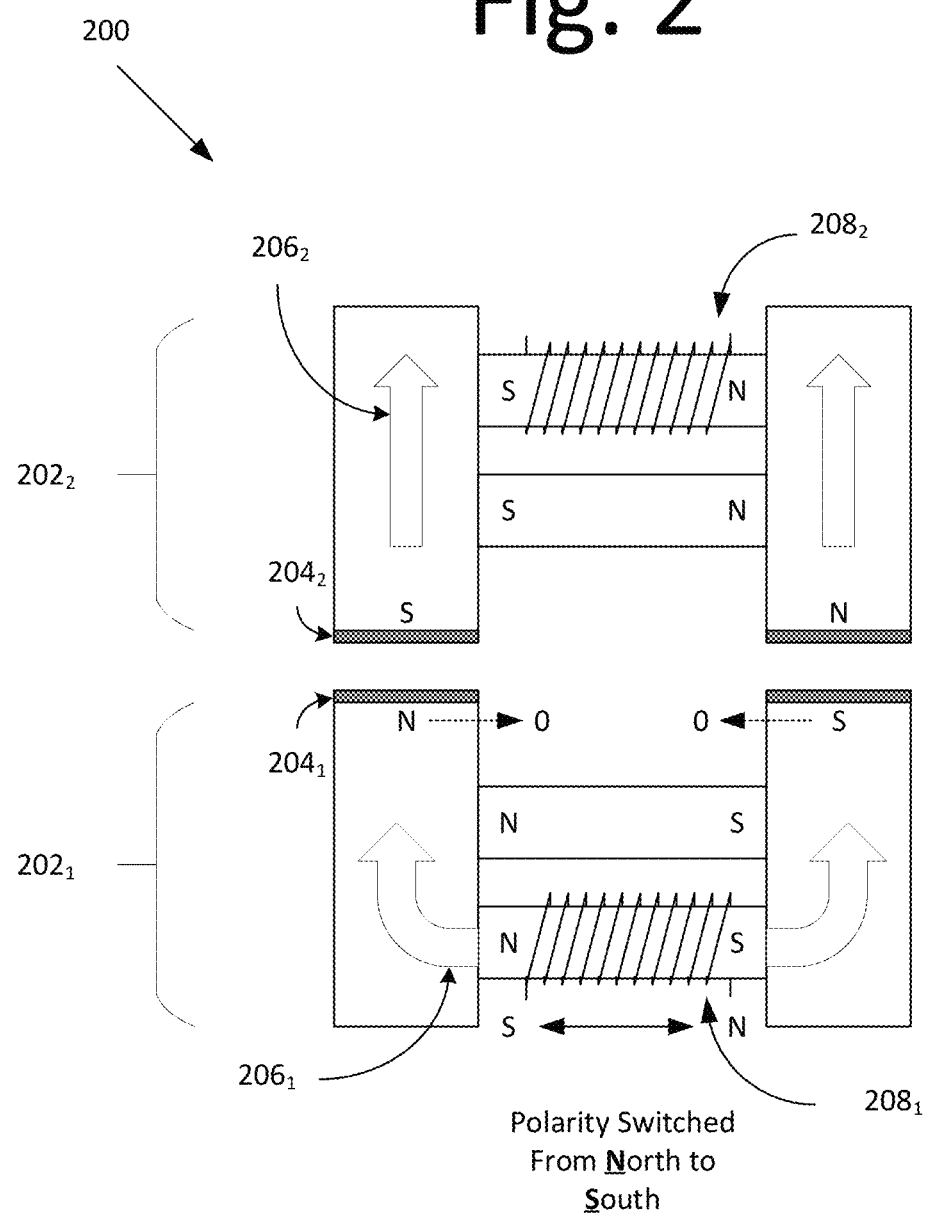

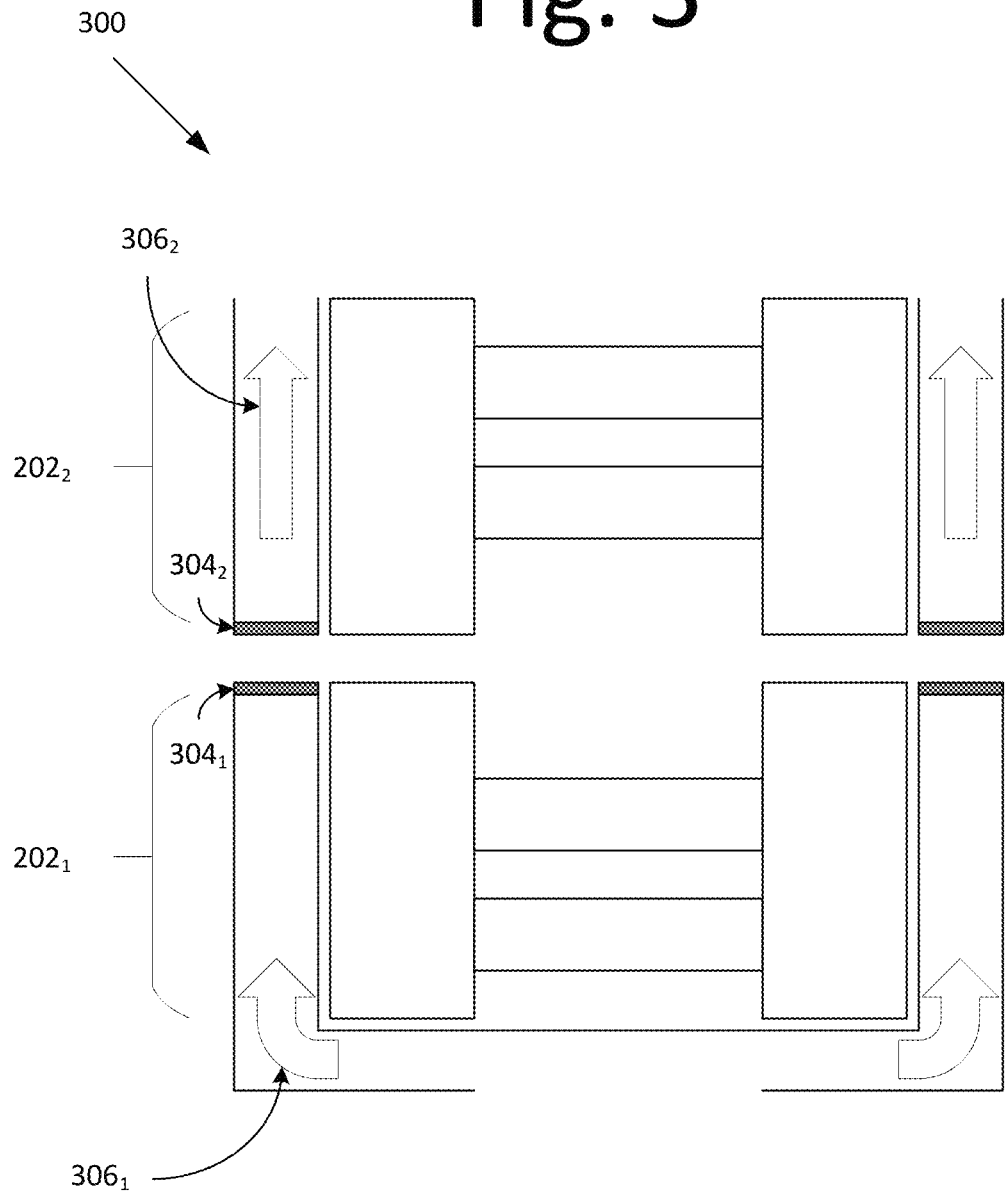

400

P

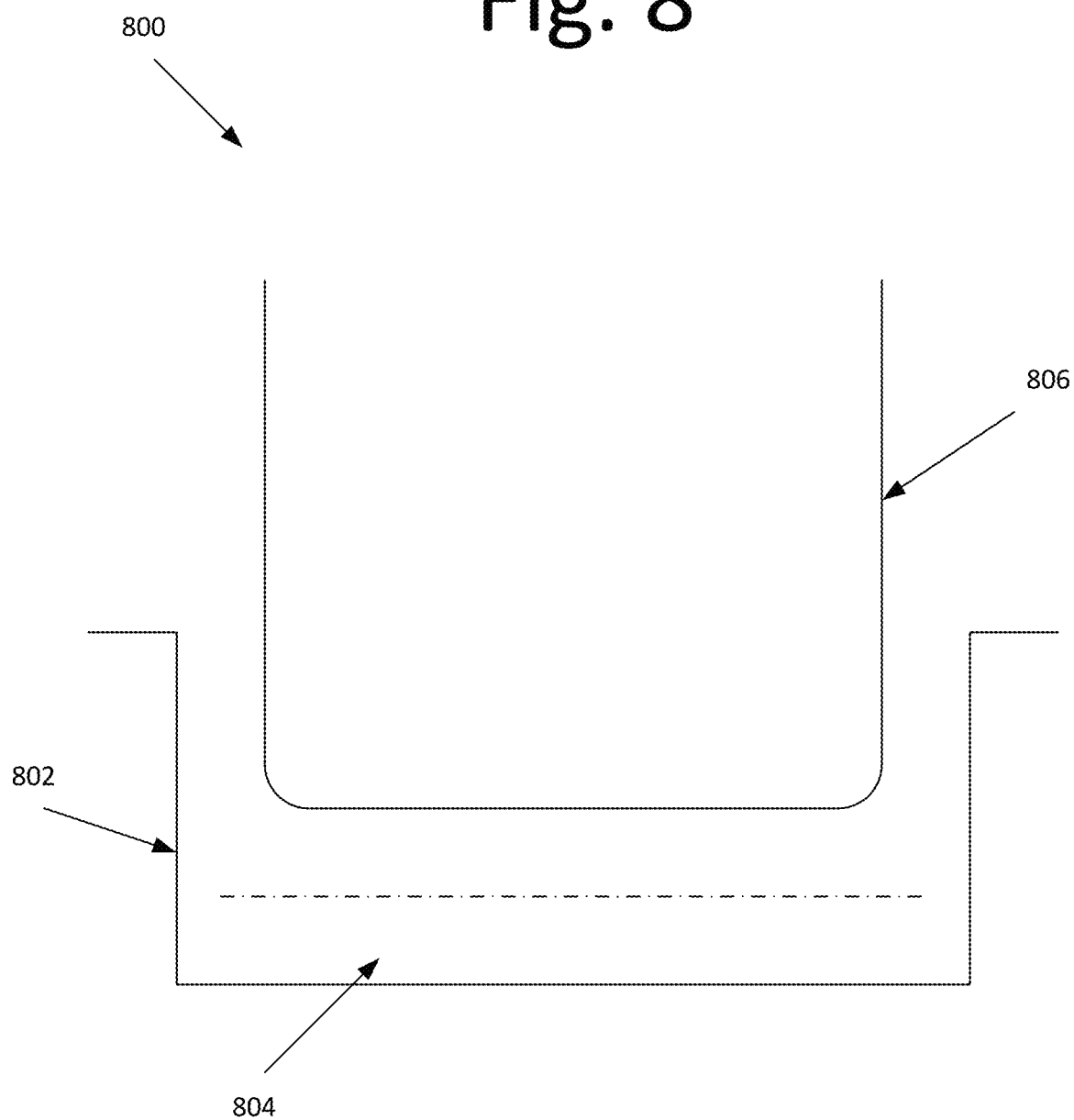

US 11,749,438 B2

THERMO-MECHANICAL MAGNETIC COUPLER

FIELD

The present invention relates to a magnetic coupler, and more particularly, to a thermo-mechanical magnetic coupler to move adjacent small satellites or CubeSats.

BACKGROUND

Hard physical mounting systems consisting of either fasteners or pins, which are used to connect adjacent satellites to form a lattice. These mounting systems allow for the formation of large lattices as well as provide high contact forces required for good thermal conductivity.

This mounting system, however, does not lend itself to autonomous assembly or adaptive reconfiguration. Further, this mounting system requires a complex mechanism to install and torque mechanical fasteners or pins autonomously. The mounting system also requires the use of multiple electromechanical devices with large numbers of moving parts, which otherwise lowers the reliability of the mounting system. For example, if the mechanical system fails for any reason, the satellites within the lattice become non-function.

Thus, an alternative mounting system may be more beneficial.

SUMMARY

Certain embodiments of the present invention may provide solutions to the problems and needs in the art that have not yet been fully identified, appreciated, or solved by current mounting systems for satellite lattices. For example, some embodiments generally pertain to thermo-mechanical magnetic coupler (the "magnetic coupler").

In an embodiment, a magnetic coupler for an electromagnetic mooring system (MMS) includes at least two magnets, of which at least one is an electro permanent magnet (EPM). Depending on the polarity of the at least two magnets, a heat path may flow between the at least two magnets or flow outwards from the at least two magnets.

In another embodiment, an electromagnetic mooring system (MMS) includes a first object and a second object, at least one of which comprises an electronic coupler that connects the first object and the second object together. The electronic coupler includes a pair of magnets, at least one of which is an EPM, having a reversible flux path. When the electronic coupler is in the ON state, the flux path moves towards the first or second object facilitating the transferring of heat from the first or second object to the second or first object, and when the electronic coupler is in the OFF state, the flux paths moves towards the EPM and the heat transfer is inhibited.

In yet another embodiment, an MMS configured to align a pin and cup thermal and electric interface between a pair of objects. The MMS includes a first object and a second object. The first object includes a female connecting member, which includes liquid, and the second object includes a male connecting member. The male connecting member electrically connects with the female connecting member by way of the liquid.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 is a diagram illustrating an electromagnetic mooring system (MMS) 200, according to an embodiment of the present invention.

FIG. 3 is a diagram illustrating an MMS 300 with separate heat paths, according to an embodiment of the present invention.

FIG. 8 is a diagram illustrating a pin and cup thermal and electrical interface aligned by an MMS, according to an embodiment of the present invention.

DETAILED DESCRIPTION OF THE EMBODIMENTS

Figure 1:
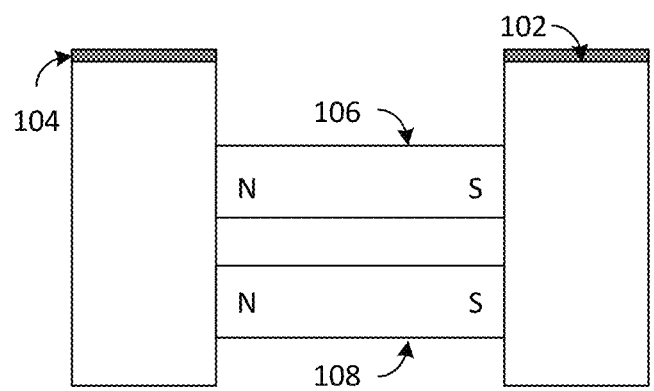
FIG. 1 is a diagram illustrating a magnetic coupler, according to an embodiment of the present invention.

Embodiments of the present invention generally pertain to a thermo-mechanical magnetic coupler (the "magnetic coupler"). In some embodiments, the magnetic coupler is configured to achieve sufficient mooring forces to maintain the position of individual satellites within a lattice of satellites. The magnetic coupler is further configured to provide a thermal conduction path to facilitate thermal management of the lattice. For example, with a lattice, the sun-side satellites tend to overheat, and the shaded-side satellites tend to overcool. To prevent overheating or overcooling, a thermal conduction path formed by the magnetic couplers transfer the heat from the sun-side (or hot-side) satellites to the shaded-side (or cold-side) satellites.

The magnetic coupler also utilizes an electro permanent magnetic effect found in magnetic material with low magnetic coercivity. Coercivity is the measure of how easily a magnet can be affected by a nearby magnetic field. Materials that can take on the properties of nearby fields are said to have low coercivity. These low coercivity materials are the basis for this magnetic coupler. For example, the magnetic coupler uses a reversible coil to switch the polarity of a low coercivity material (e.g., Alnico) that effectively nulls a high coercivity material (e.g., Neodymium). The ability to null the stronger magnet is the process by which the magnetic coupler connects and disconnects adjacent satellites. It should be appreciated that both states are electrically powered off states. The "ON" state and "OFF" state are in regard to the magnetic flux path. The "ON" state has external magnetic poles, and with the OFF state, all the flux is contained, and has no external magnetic poles.

In another embodiment, an electronic processor may be used to switch the magnetic coupler from an OFF state to an ON state or vice versa. Based on the desired coupling state of the satellite, an electronics controller (not shown) either directly or indirectly through a lower level processor or processors commands the mooring system (e.g., the magnetic coupler) to change states. The state change is accomplished by applying a pulse of current through a coil in the direction that causes an external magnetic field that permanently switches the magnetic polarity of the low coercivity magnet. The pulse of current is controlled by the electronics controller using additional electronics.

The magnetic coupler may include contact pads that are configured to press against contact pads of an adjacent magnetic coupler. In some embodiments, thermal interface material is applied to these contact pads. When the magnetic coupler is switched ON, the magnetic coupler is configured to generate magnetic forces to squeeze the thermal interface material between the contact pads. The squeezing of the thermal interface material increases the real contact area, allowing for thermal conductance of the interface to be maximized. The real contact area may be defined as the surface area over which the two bodies of an interface are in molecular contact. In some embodiments, this is necessary for direct conduction of heat across the interface. Because of mechanical misalignments and/or microscopic surface variation, the entire apparent area of thermal contact pad may not be active in conducting heat. As the pressure is increased, more of the thermal material is forced to comply with the mating contact pad, increasing the real contact area. In other words, without the thermal interface material, transfer of heat between the contact pads by conduction is restricted.

By incorporating the magnetic coupler into satellites, the satellites' operation cost remains low. For example, the magnetic coupler does not require moving parts, nor does the magnetic coupler require power during static operation. This is important in space in the terms of longevity and reliability. For example, cold welding does not affect the magnetic coupler. Further, the magnetic couplers allow the satellites to dock and undock. The docking and undocking of the satellites allows for different lattice formations.

FIG. 1 is a diagram illustrating a magnetic coupler 100, according to an embodiment of the present invention. In some embodiments, magnetic coupler 100 may be composed of iron (Fe). In other embodiments, magnetic coupler 100 may be composed of: carbon steel, ferrite, stainless steel, electrical steel (SiFe), mu-metal (NiFe), or other material with high relative magnetic permeability. Magnetic coupler 100 may also include thermal material 104 that is applied on contact pads 102 of magnetic coupler 100.

It should be appreciated that thermal material 104 prevents a cold welding event from occurring. Cold welding occurs when two clean metallic materials are held in contact in a vacuum. The clean metallic materials form a bond across the surfaces of the contact pads effectively joining them into a single piece of material. The thermal material prevents this contact from occurring.

Magnetic coupler 100 may include a neodymium (NEO) magnet 106 and an EPM 108. In this embodiment, NEO magnet 106 is attracted to another opposite facing magnet depending on the polarity of magnetic coupler 100. It should be appreciated, however, that the embodiments are not limited to NEO magnets, and any magnet may be used so long as the magnet is paired with an EPM.

In certain embodiments, an opposite facing magnetic coupler may be positioned to interface with magnetic coupler 100. FIG. 2 is a diagram illustrating an electromagnetic mooring system (MMS) 200, according to an embodiment of the present invention. In this embodiment, MMS 200 shows a first magnetic coupler $202_1$ and a second magnetic coupler $202_2$, both of which are pressed against each other. As discussed above, magnetic couplers $202_1$, $202_2$ have two states—attracting (or ON) state and OFF state. To connect, either magnetic couplers $202_1$, $202_2$ may be in the ON state. In the ON state, when first magnetic coupler $202_1$ is pressed against second magnetic coupler $202_2$, thermal material $204_1$, $204_2$ between the surface of magnetic couplers $202_1$, $202_2$ are also pressed. This form a high thermal conductance path. More specifically, the pressing of thermal material $204_1$, $204_2$ allows for heat to transfer by way of magnetic couplers $202_1$, $202_2$ and into the other satellite (not shown).

For heat to transfer, the heat flows through what is called a heat path with very low pressure (e.g., ~2.5 to 5 pounds of force or 30 psi). FIG. 2, for example, shows a heat path $206_1$, $206_2$. In this example, heat on the hot-side satellite routes through the frame of magnetic coupler $202_1$ and into the interface (i.e., thermal material $204_1$). The heat then crosses over into magnetic coupler $202_2$ from thermal material $204_2$ and into the cold-side satellite, for example.

In another embodiment, magnetic couplers $202_1$, $202_2$ are not used as the heat path; rather, a separate heat path may surround magnetic couplers $202_1$, $202_2$. FIG. 3 is a diagram illustrating MMS 300 with a separate heat path $306_1$ for magnetic coupler $202_1$ and a separate heat path $306_2$ for magnetic coupler $202_2$. It should be appreciated that this embodiment uses the magnetic force to provide for the mechanical coupling of magnetic couplers $202_1$, $202_2$ with a thermal interface separated from magnetic couplers $202_1$, $202_2$ but on the same plane. For example, in this embodiment, thermal material $304_1$, $304_2$ is located within heat paths $306_1$, $306_2$ to enable transfer of heat when magnetic couplers $202_1$, $202_2$ connect to one another. An air gap, as shown described below with respect to FIG. 4, is maintained between the magnetic couplers to prevent a cold-welding event and maximize the force applied to the thermal interface material.

Either embodiment allows heat to transfer from one satellite to another, i.e., from the hot-side satellite to the cold-side satellite. In other words, the magnetic couplers (or magnets) establish a thermal path for heat transfer.

Returning to FIG. 2, in some embodiments, when first magnetic coupler $202_1$ and second magnetic coupler $202_2$ are coupled together in the ON state, magnetic couplers $202_1$, $202_2$ draw zero current. For example, to draw zero current, the current to reverse the polarity is provided via a pulse waveform. The pulse of the current is maintained for the minimum amount of time to generate the magnetic field in coil $208_1$, $208_2$, which permanently reverses the magnetic polarity in the EPM. Once the EPM has reversed polarity, all current can be removed from coil $208_1$, $208_2$ without effecting the EPM. In the associated electrical controller, there may be some minor current draw.

Using FIG. 2 as an example, it is assumed that magnetic coupler $202_1$ is the first magnet and magnetic coupler $202_2$ is the second magnet. Now, with magnetic coupler $202_1$, each side may have a north pole and a south pole. When the polarity is switch from north to south, for example, the flux is conducted internally, and the external polarity in magnetic coupler $202_1$ changes to an OFF state.

Continuing with this example, if magnetic coupler $202_2$ is at an OFF state, then magnetic coupler $202_2$ will not couple to magnetic coupler $202_1$. If, however, magnetic coupler $202_2$ is in an ON state or the poles are north and south, then magnetic coupler $202_2$ couples to magnetic coupler $202_1$. Because magnetic couplers $202_1$, $202_2$ are coated with thermal material $204_1$, $204_2$, magnetic couplers $202_1$, $202_2$ retain thermal material $204_1$, $204_2$ when magnetic couplers $202_1$, $202_2$ decouple. It should be appreciated that magnetic couplers $202_1$, $202_2$ may face in any orientation, and as long as there is a return path to negate the flux, magnetic couplers $202_1$, $202_2$ may connect and disconnect.

Figure 4A:
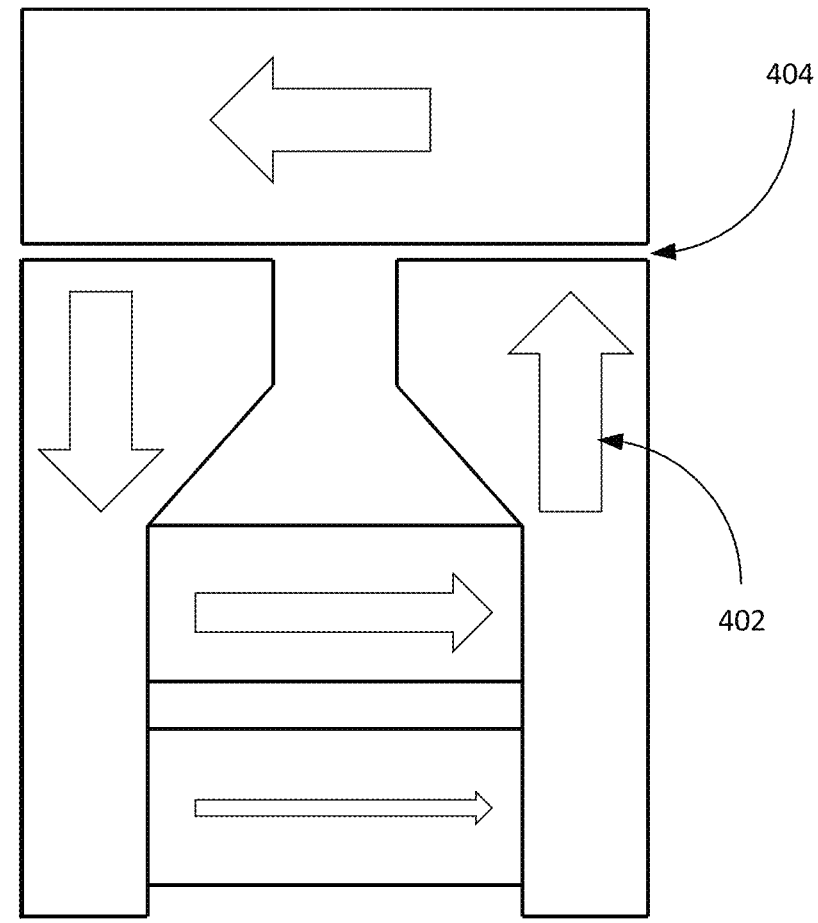
FIG. 4A is a diagram illustrating a flux path.
Figure 4B:
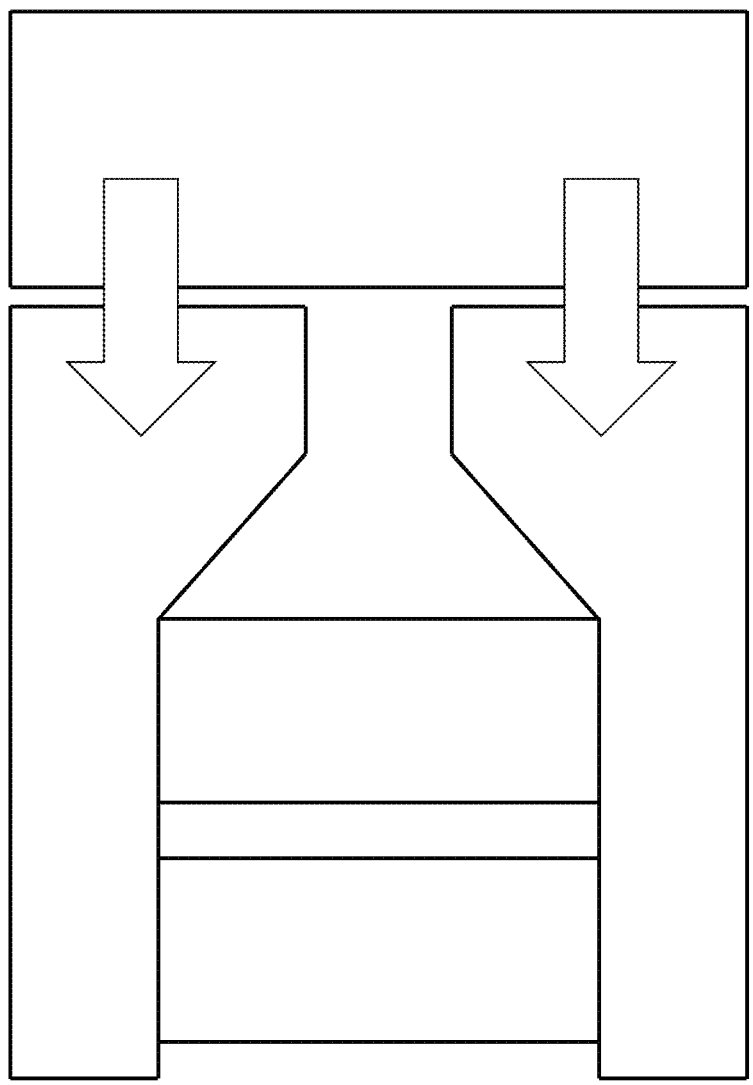
FIG. 4B is a diagram illustrating a mooring force, according to an embodiment of the present invention.

FIG. 4A is a diagram illustrating a flux path, and FIG. 4B is a diagram illustrating a mooring force, in a magnetic coupler 400, according to an embodiment of the present invention. In FIG. 4A, magnetic flux path 402 flows from the north poles of the magnets, across the airgaps 404, and returns to the south poles of the magnets. The pull force is determined by the magnetic field density, area of the airgap, and the separation distance of the magnetic surfaces. As shown in FIG. 4B, a positive pull or mooring force is generated when the magnetic circuit is established as described in FIG. 4A above.

Figure 5:
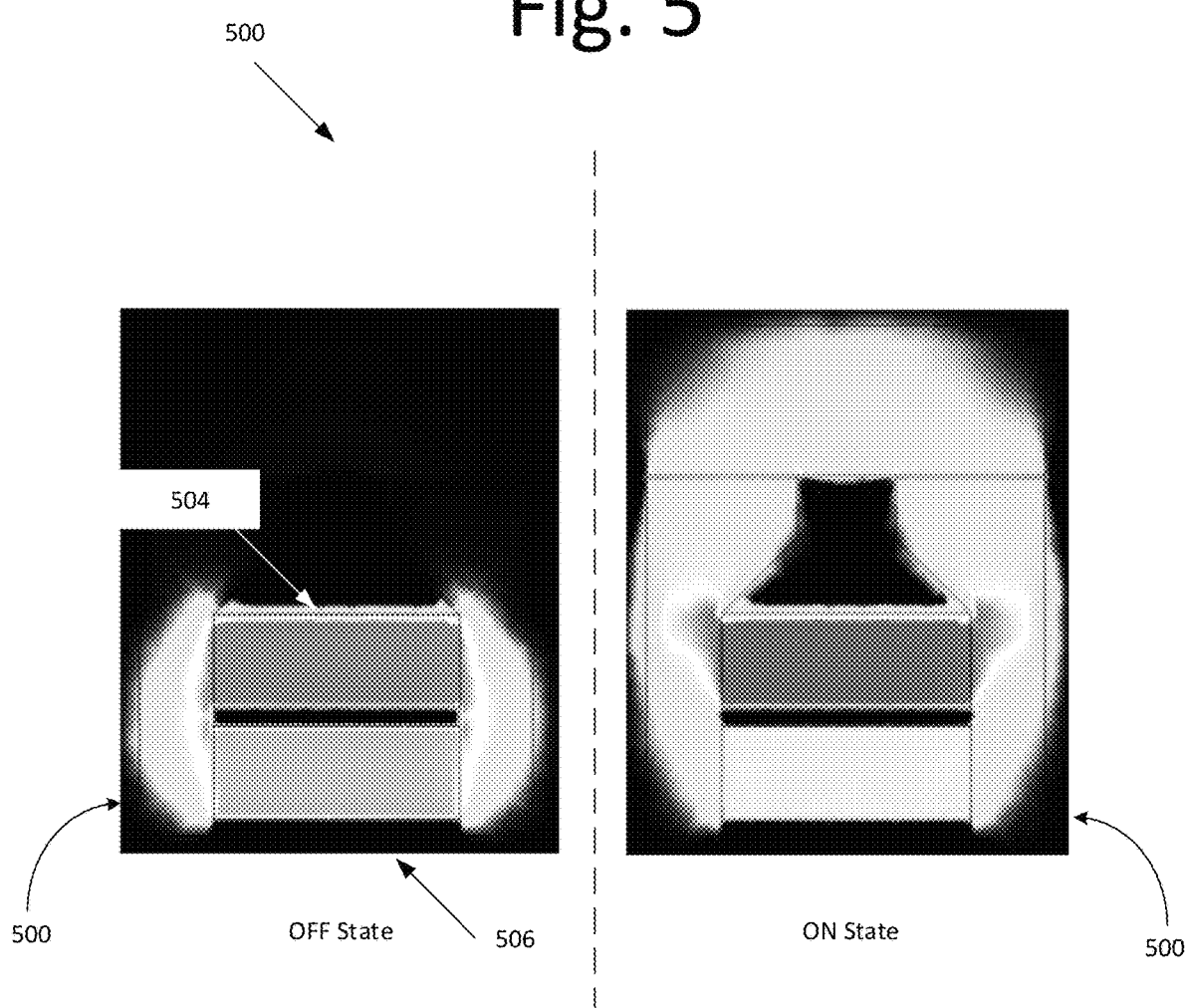
FIG. 5 is a diagram illustrating a switchable magnet system, according to an embodiment of the present invention.

FIG. 5 is a diagram illustrating a switchable magnetic coupler 500, according to an embodiment of the present invention. Typically, there are two types of magnets—permanent magnets and electromagnets. However, a third type of magnet—the electro permanent magnet (EPM)—has also been used. EPMs are a type of permanent magnet with the capability of having its internal magnetic field reversed or realigned by a sufficiently strong externally applied field. The external field can be induced by either a permanent magnet or a coil by applying pulse of currents. These magnets are made from low coercivity or "soft" material. For example, Alnico is an example of a low coercivity or "soft" material. A NEO magnet, however, is an example of a high coercivity or "hard" material.

EPMs may be used with other types of magnets to form compound magnets, which can be switched "OFF", "ON", or have their poles reversed. In FIG. 5, magnetic coupler 500 is shown in the OFF state and the ON state. Magnetic coupler 500 includes a NEO magnet 504 and an EPM 506. When magnetic coupler 500 is in the ON state and a strong holding force is desired, the magnetic flux moves towards the opposite facing magnetic coupler (not shown). When magnetic coupler 500 is switched to an OFF state, EPM 506 shorts the path, moving the magnetic flux from NEO magnet 504 to EPM 506. By having a switchable magnet and a thermal interface (e.g., as shown in FIG. 2), not only does the two magnetic couplers couple to one another, but heat transfer from one satellite to another is possible.

In embodiments that utilize a coil to switch polarity, the coil (not shown) generates an external magnetic field that sets the polarity of EPM 506. EPM 506 is a combination of "soft" magnetic material and the coil. The coil may have current flowing in both directions. The current then generates magnetic fields in both polarities with sufficient strength to "hard" flip the polarity in the "soft" magnetic material. Once EPM 506 is "hard" flipped, EPM 506 maintains the new polarity indefinitely. The coil currents are controlled by an electronic controller in some embodiments. The controller may use a circuit in certain embodiment. For example, the circuit is an H-bridge that controls the direction and amount of current within the coil. In certain embodiments, the controller is a single device controlling all EPMs or a distributed system were multiple devices are used.

Figure 6:
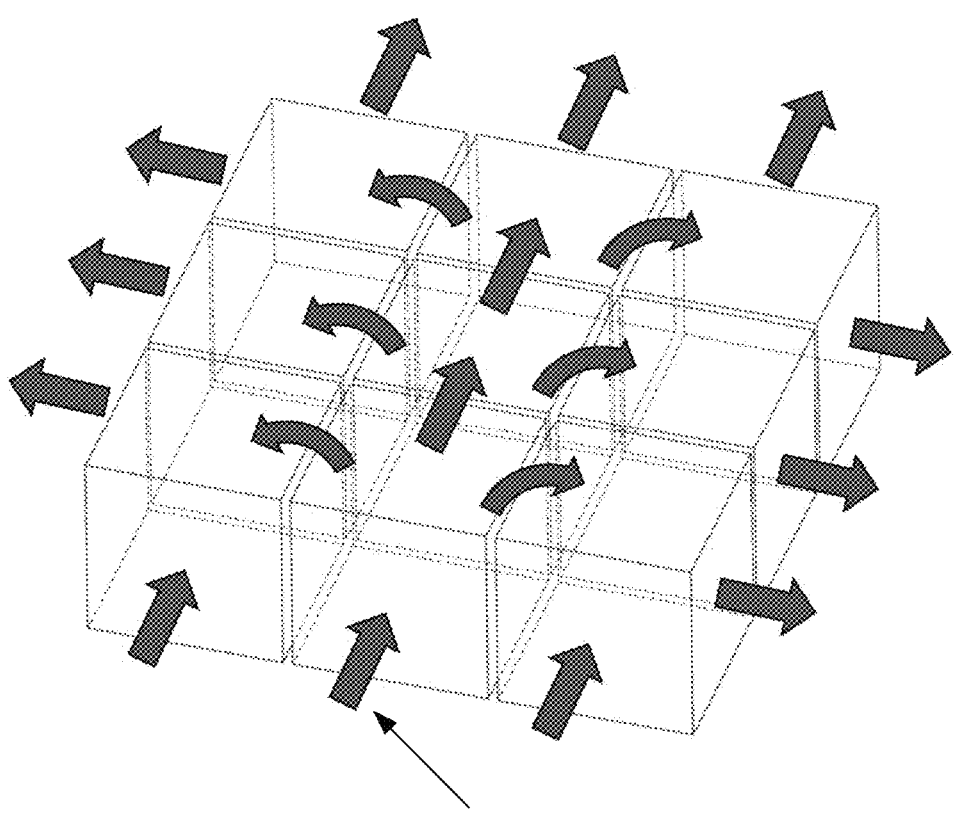
FIG. 6 is a chart showing a satellite lattice, according to an embodiment of the present invention.

FIG. 6 is a diagram illustrating a satellite lattice 600, according to an embodiment of the present invention. Satellite lattice 600 shows that the magnetic couplers can achieve the necessary amount of heat transfer needed between satellites to mitigate the extremes of temperature. For example, FIG. 6 shows heat flow path P moving through satellite lattice 600 via magnetic couplers.

Figure 7A:
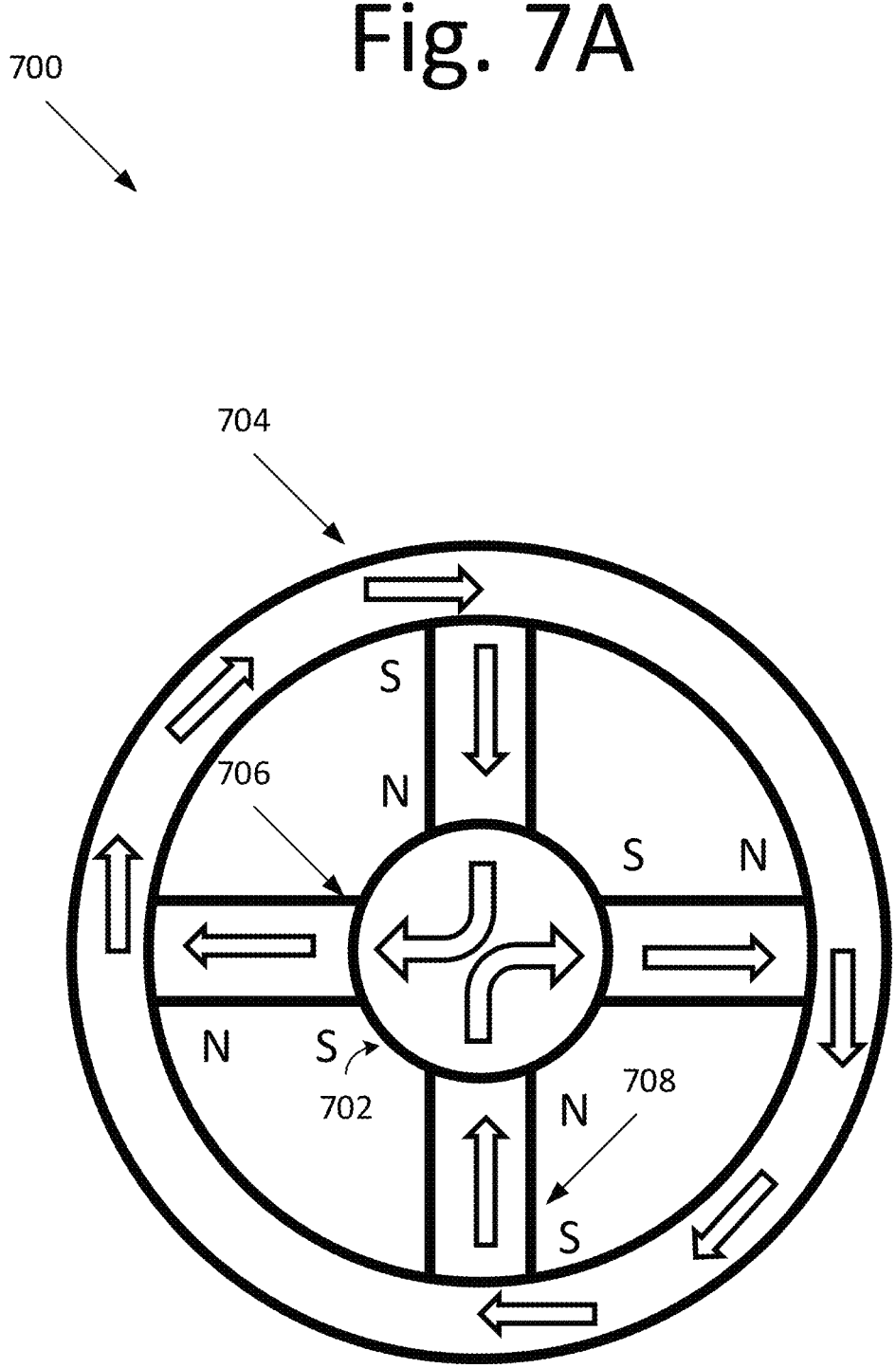
FIG. 7A is a diagram illustrating a magnetic coupler 700.
Figure 7B:
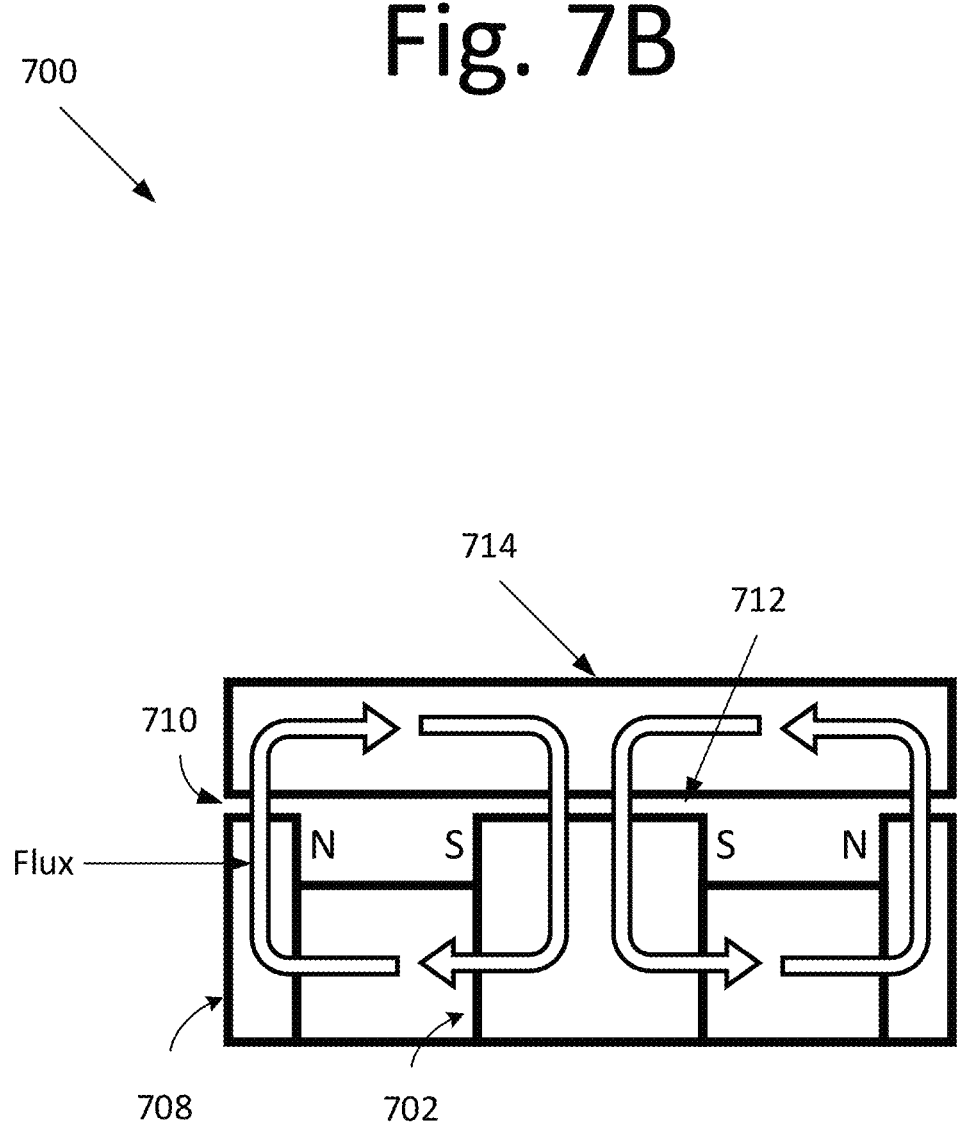
FIG. 7B is a diagram illustrating a cross-sectional view of magnetic coupler 700, according to an embodiment of the present invention.

FIG. 7A is a diagram illustrating a magnetic coupler 700, and FIG. 7B is a diagram illustrating a cross-sectional view of magnetic coupler 700, according to an embodiment of the present invention. In this embodiment, magnetic coupler includes an inner material 702 and outer material (or ring) 704. Inner material 702 may be composed of iron, carbon steel, ferrite, stainless steel, electrical steel (SiFe), mu-metal (NiFe), or other material with high relative magnetic permeability. Outer material 704 may be composed of iron, carbon steel, ferrite, stainless steel, electrical steel (SiFe), mu-metal (NiFe), or other material with high relative magnetic permeability. A plurality of connecting members 706, 708 are configured to connect inner material 702 and outer material 704. For example, in this embodiment, a pair of connecting members 706 are NEOs and another pair of connecting member 708 are EPMs. It should be appreciated that the embodiments are not limited to a pair of connecting members. For example, the embodiments may include at least two connecting members, of which at least one connecting member is an EPM.

Magnetic coupler 700 is planar in the sense that the thickness is less than its diameter. The planar arraignment is beneficial for use on satellite designs as it allows for the maximum use of the internal volume of the satellite for other payloads. The planar arraignment also allows for stronger magnets increasing the available pull forces.

For purposes of explanation, inner material 702 may be the south pole and outer material 704 may be the north pole. When in the "OFF" state, the flux flows internally in inner material 702 and outer material 704. The flux leaves the north pole of the NEO magnets flows around outer material 704 to the south poles of an EPM. From there, the flux flows through the EPM exiting out the EPM's north pole and back to the NEO south pole through the inner material.

When in the "ON" case, the flux flows perpendicular to the "OFF" case. The flux leaves outer material 704 crossing outer airgap 710 to adjacent ferromagnetic material 714. The flux returns to inner material 702 via inner airgap 712. The flux then flows through inner material 702 to the south poles of each magnet. The magnetic circuit is then completed when the flux flows through the magnets to the north poles.

In some embodiments, rather than using a pair of NEOs and a pair of EPMs, magnetic coupler 700 may have four EPMs. By using four EPMs, magnetic coupler 700 becomes a tri-state device, i.e., a magnet having switchable polarity, with two ON states and one OFF state. This tri-state device may then reject (or push) an adjacent satellite, essentially launching the adjacent satellite. For example, if two satellites are moored, with one satellite being in an inner south configuration and the other being an inner north configuration, the satellites would attract each other and would be described as having a positive mooring force. If one satellite switched, such that both satellites were in an inner south configuration, the satellites would repel each other and would be described as having a negative mooring force. A negative mooring force would push the satellites apart.

FIG. 8 is a diagram illustrating a pin and cup thermal and electrical interface aligned by an MMS 800, according to an embodiment of the present invention. In this embodiment, an adjacent device (partially shown) may have a female connecting member 802. Female connecting member 802 may include liquid (or fluid) 804 such as mercury or liquid metal, for example. The other device (also partially shown) may include a male connecting member 806. In some embodiments, liquid 804 is attracted to both male connecting member 806 and female connecting member 802, and the resulting mechanical coupling causes heat (discussed below) to flow freely between female connecting member 802 and male connecting member 806.

With this system, geometric alignment is required rather than a clamping mechanism. In this embodiment, liquid 804 is constrained by the geometry of female connecting member 802 and male connecting member 806, which enters female connecting member 802. Since male connecting member 806 is composed of copper, iron, or any thermally conductive material, male connecting member 806 becomes electrically connected with female connecting member 802 by way of liquid 804. Additionally, transfer of heat may also be achieved by way of liquid 804.

In some embodiments, pin and cup configuration shown in FIG. 8 are coarsely aligned via a blind mate. For example, a moving satellite is positioned over MMS 800, and when MMS 800 is switched "ON", mooring forces male connecting member 806 (e.g., the pin) into female connecting member 802 (e.g., the cup). The female connecting member 802 is tolerant of misalignments and guides male connecting member 802 into the center of female connecting member 802. A heat path is established via liquid 804 in female connecting member 802. Since liquid 804 contact acts as a high contact force, mechanical coupling heat will flow freely across female connecting member 802 and male connecting member 806 connection. In a pin and cup arrangement that utilizes an electrically conductive liquid, such as mercury, an electrical power bus may be established by electrically isolating the female connecting member 802 and male connecting member 806. Additionally, in some embodiments, data is transmitted over the connection in a traditional serial protocol or as using a data over power method.

Some embodiments generally pertain to holding one or more objects, such as satellites, together with a reconfigurable mooring system. Additionally, some embodiments pertain to the transfer of heat from one object to another by way of the reconfigurable mooring system. It should be appreciated that the embodiments are not limited to holding satellites together with the reconfigurable mooring system. One of ordinary skill in the art would appreciate that the reconfigurable mooring system may be used to connect other objects together such as a laptop to a docking station or a phone charging module. Another example would be to use the reconfigurable mooring system for on-orbit replenishment, e.g., connecting a fuel pack to a space vehicle.

Depending on the embodiment, the reconfigurable mooring system uses little to no power, and has a high thermal conductance. For example, the reconfigurable mooring system uses small or low current pools for very short periods of time (e.g., in milliseconds) to reconfigure objects. More specifically, certain embodiments use a low current system to charge up a circuit that would release a larger current pulse than would otherwise be provided. In some embodiments, a pulse may be used to switch the reconfigurable mooring system from an ON state to an OFF state or vice versa. Furthermore, the high thermal conductance is achieved by the reconfigurable mooring system at low pressure. This system provides sufficient, reconfigurable heat transfer without consuming significant energy. For example, if an instrument package on a drone were generating excessive heat, the heat may be rerouted by the reconfigurable mooring system to radiators on the drone. In other words, the reconfigurable mooring system provides alternatives for heat management.

MMS may also be used for rapid noncontact (inductive) recharging of a wireless device such as an iPhone or laptop. The excess heat generated by the rapid recharging may be routed from the device to the recharger via the MMS.

In certain embodiments, MMS may be utilized with docking remote modules to a power and thermal backplane. In these embodiments, the MMS may hold the system in place as well as provide a thermal and power interface to the subsystem. This may be a terrestrial (computer docking station) or space system (instrument docking station).

In certain embodiments, attaching remote modules to existing space assets, externally or to provided internal attachment points, may provide on-orbit upgrades, replenishment, or orbital maintenance that would extend the life of the space asset.

In some embodiments, when gravity cannot be used as a separating force, the reconfigurable mooring system may be used to provide an initial separating force. The initial force can only be generated by the tri-state configuration of the MMS.

Figure 9:
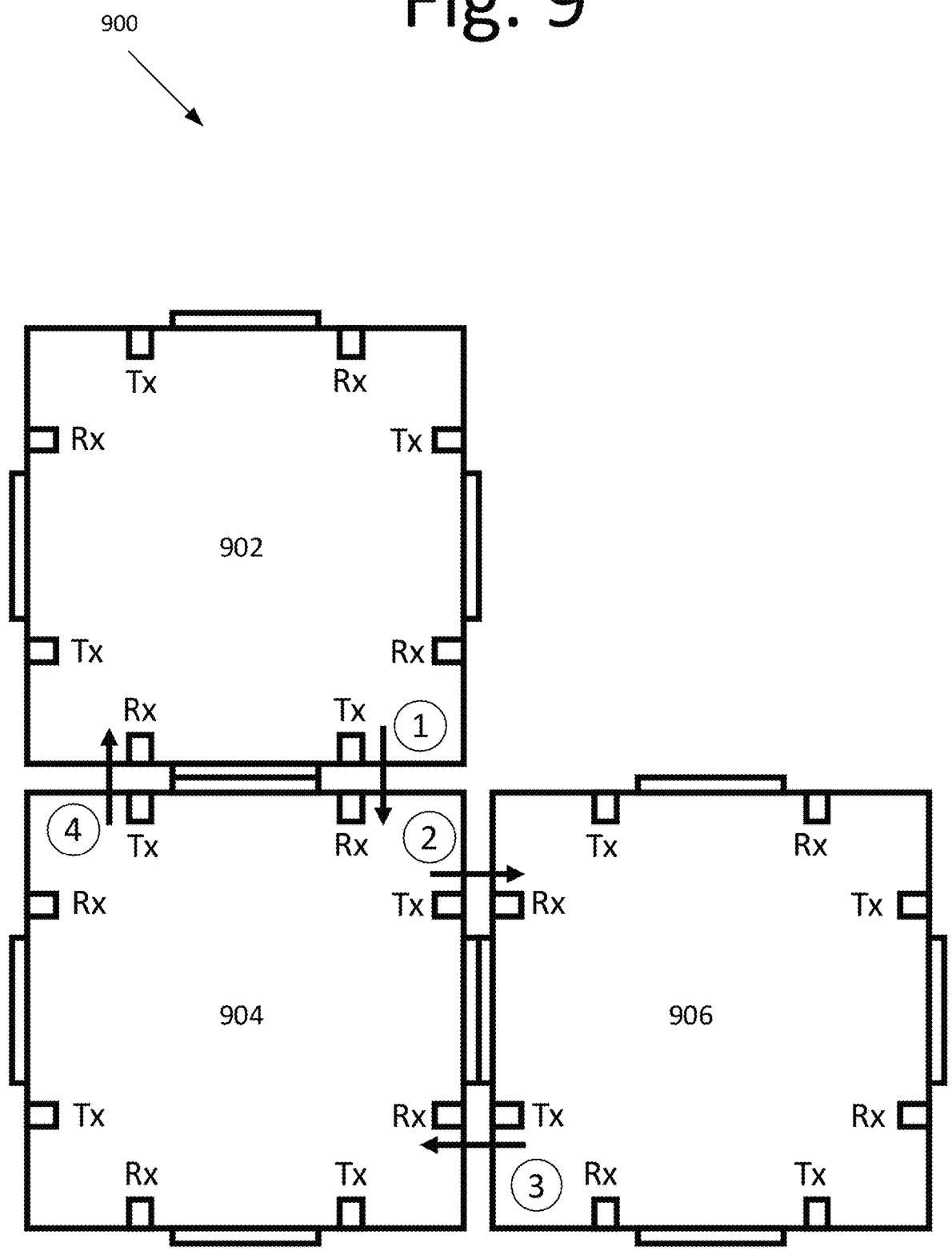
FIG. 9 is a diagram illustrating a face-to-face communication system using one or more magnetic couplers, according to an embodiment of the present invention.

In some embodiments, satellites that are connected to one another by way of magnetic couplers may form an electro-optical communication link. FIG. 9 is a diagram illustrating a face-to-face communication system 900 using one or more magnetic couplers, according to an embodiment of the present invention. In this embodiment, each magnetic coupler, as shown in FIG. 10, may include a sensor for data communication.

Figure 10:
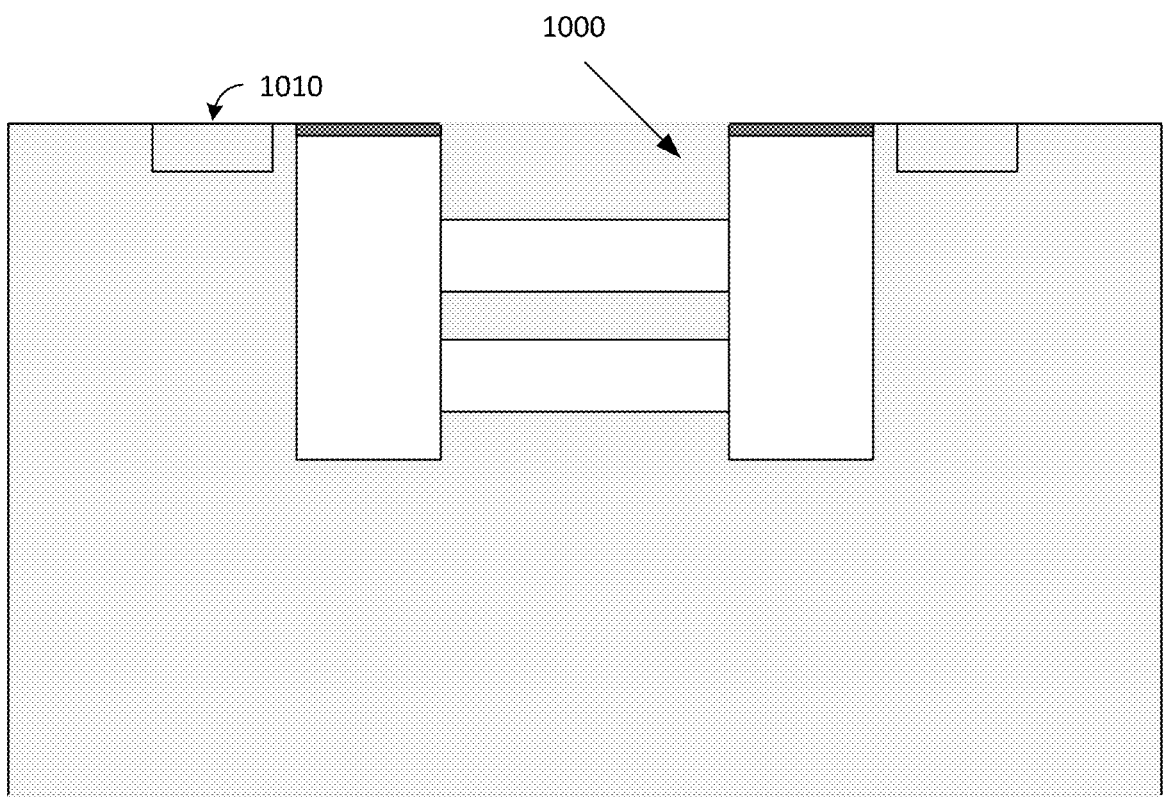
FIG. 10 is a diagram of a magnetic coupler embedded within a satellite, according to an embodiment of the present invention.

FIG. 10 is a diagram of a magnetic coupler 1000 embedded within a satellite, according to an embodiment of the present invention. In this embodiment, each side of magnetic coupler 1000 may include a sensor 1010. Sensor 1010 may include radio frequency (RF) technology, infrared (IR) technology, or any other technology that would facilitate communication between adjacent satellites. Magnetic coupler 1000 may be lined up with a magnetic coupler of an adjacent satellite allowing data to be transmitted from one satellite to the other. In other words, magnetic coupler 1000 is not only used to make a structural connection between adjacent satellites, but also used to align interfaces (e.g., thermal interface, optical interface, etc.) of adjacent satellites.

Returning to FIG. 9, each satellite 902, 904, 906 within the lattice of satellites may communicate with one another. Further, since each side of satellite 902, 904, 906 includes a magnetic coupler, each satellite 902, 904, 906 may communicate data with one or more adjacent satellites. This configuration allows data to flow through each satellite, and in any desired direction. Although three satellites are shown in FIG. 9, the embodiments may include any number of satellites in any configuration.

In this embodiment, satellite 902 may initiate communication to satellite 906 with satellite 904 acting as a router to send messages to satellite 906. Satellite 906 responds to message from satellite 902 with satellite 904 acting as a router to send messages to satellite 902. To initiate communication, a communication link is established by way of wireless technology, such as light emitting diodes (LEDs), laser, radio frequency (RF), or any other hardware that passes data and does not require physical contact. This is an example of point-to-point protocol.

In some embodiments, satellite 904 may broadcast a message from all of its ports (e.g., transmit port Tx), when the message is for general distribution. In some further embodiments, satellite 902 may interrogate satellite 904 to determine the state. For example, an identification and location of the connected satellite may be determined in certain embodiments.

In the embodiment shown in FIG. 9, each satellite 902, 904, and 906 may receive signals via Rx port and transmit signals via Tx port. Each satellite 902, 904, and 906 may have multiple Rx ports and Tx ports. In other embodiments, each satellite may use a single port to transmit and receive signals.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A magnetic coupler for an electromagnetic mooring system (MMS) configured to create coupling between at least one magnet and an adjacent structure, comprising:
   the at least one magnet is an electro permanent magnet (EPM), wherein the EPM comprises a first state of polarity and a second state of polarity, the first state is an attracting state and the second state is an OFF state;
   the adjacent structure comprising a magnet or a ferromagnetic material;
   depending on a state of polarity of the at least one magnet, a magnetic field is established, the magnetic field establishes a clamping force, the clamping force establishes a molecular contact and the molecular contact establishes a heat path, allowing heat to flow through the heat path between the at least one magnet and the adjacent structure, or flow outwards from the at least one magnet to the adjacent structure; and
   a thermally conductive material between the at least one magnet and the adjacent structure, wherein
   the thermally conductive material making the molecular-level contact with the adjacent structure, creating a high thermal conductance path with minimally applied pressure,
   the high thermal conductance path is the heat path regulating temperature of the attached the adjacent structure, and
   the minimally applied pressure is a minimum force applied to a contact area of the thermally conductive material establishing the molecular-level contact of the thermally conductive material.

2. The magnetic coupler of claim 1, further comprising:
   thermally conductive material exposed to space, and when a compressive force is applied against the adjacent magnet or adjacent material, transfer of heat is facilitated to or from the other magnet or adjacent material, and
   when non-compressive force is applied, or the thermally conductive material is separated from, the other magnet or adjacent material, the heat is prevented from transferring to or from the other magnet or adjacent material.

3. The magnetic coupler of claim 2, wherein,
   when the magnetic coupler is switched to the attracting state, and the thermally conductive material is pressed against the other magnet or adjacent material, the high thermal conductance path is created to facilitate the transfer of the heat to or from the other magnet or adjacent material, and
   when the magnetic coupler is switched to the OFF state, and a low or zero conductance path is formed preventing the transfer of the heat to or from the other magnet or adjacent material.

4. The magnetic coupler of claim 3, wherein the high thermal conductance path is established by applying a low force through the thermally conductive material, resulting in low pressure in the thermally conductive material and high thermal conductance in the heat path.

5. The magnetic coupler of claim 2, wherein the thermally conductive material is deposited or applied on one or more contact pads of the magnetic coupler, wherein the depositing of, or the application of, the thermally conductive material prevents cold welding from occurring.

6. The magnetic coupler of claim 1, wherein, when the magnetic coupler is pressed against another body, a current to reverse polarity is provided to attract the other body to the magnetic coupler.

7. The magnetic coupler of claim 6, wherein the current is maintained for a predefined period of time to generate a magnetic field within a coil of the magnetic coupler,
the magnetic field is configured to reverse the magnetic polarity in the at least one magnet.

8. The magnetic coupler of claim 7, wherein, when the magnetic polarity of the at least one magnet is reversed, the current is removed from the coil without affecting the magnetic polarity of the at least one magnet.

9. The magnetic coupler of claim 1, further comprising:
a separate heat path comprising thermal conductive material configured to transfer heat when the magnetic coupler is connected to another body.

10. The magnetic coupler of claim 1, wherein the at least one magnet comprise a permanent magnet facing the adjacent structure.

11. An electromagnetic mooring system (MMS) configured to create a coupling between a pair of magnets, comprising:
a first object and a second object, at least one of the first object or the second object comprises an electronic coupler connecting the first object and the second object together, wherein
the electronic coupler comprises the pair of magnets, at least one of which is an electro permanent magnet (EPM), having a magnetic reversible flux path,
the electronic coupler further comprises a thermally conductive material between the pair of magnets, the thermally conductive material making molecular-level contact with the first object or the second object, creating a high thermal conductance path with minimally applied pressure,
the high thermal conductance path is the heat path allowing for temperature regulation of the first object or the second object,
the minimally applied pressure is a minimum force applied to a contact area of the thermally conductive material establishing the molecular-level contact of the thermally conductive material,
when the electronic coupler is in an ON state, the magnetic flux path moves towards the first or second object facilitating the transferring of heat from the first or second object to the second or first object, and
when the electronic coupler is in the OFF state, the flux path moves towards the EPM and the heat transfer is inhibited.

12. The MMS of claim 11, wherein the thermally conductive material exposed to space, and when pressed against the first object or the second object, transfer of heat is facilitated to the first object or the second object.

13. The MMS of claim 12, wherein, when the magnetic coupler is switched to an ON state, and the thermally conductive material is pressed against the first object or the second object, a high thermal conductance path is formed to facilitate the transfer of heat to first object or the second object.

14. The MMS of claim 13, wherein the high thermal conductance path is established by applying a low force through the thermally conductive material, resulting in low pressure in the thermally conductive material and high thermal conductance in the heat path.

15. The MMS of claim 12, wherein the thermally conductive material is deposited or applied on one or more contact pads of the magnetic coupler, the depositing of, or the application of, the thermally conductive material prevents cold welding from occurring.

16. The MMS of claim 11, wherein, when the magnetic coupler is pressed against first object or the second object, a current to reverse polarity is provided to attract the first object or the second object to the magnetic coupler.

17. The MMS of claim 16, wherein the current is maintained for a predefined period of time to generate a magnetic field within a coil of the magnetic coupler, the magnetic field is further configured to reverse the magnetic polarity in at least one of the pair of magnets.

18. The MMS of claim 17, wherein, when the magnetic polarity of at least one of the pair of magnets is reversed, the current is removed from the coil without affecting the polarity of one of the at least one of the pair of magnets.

19. The MMS of claim 11, wherein the magnetic coupler comprises a separate heat path comprising thermal conductive material configured to transfer heat when the magnetic coupler is connected to another body.

20. The MMS of claim 11, wherein one of the pair of magnets comprise a permanent magnet facing the at least one EPM.

21. The MMS of claim 11, further comprising:
an air gap maintained between the first object and the second object to prevent a cold-welding event and maximize a force applied to a thermal interface material.

22. The MMS of claim 11, wherein the electronic coupler at least one sensor on one or both sides of the magnetic coupler configured to facilitate communication between the first object and the second object.

* * * * *